United States Patent
Thelen et al.

(10) Patent No.: US 11,670,091 B2
(45) Date of Patent: Jun. 6, 2023

(54) METHOD AND ARRANGEMENT FOR VALIDATING SPEED LIMIT INFORMATION FOR A ROAD VEHICLE

(71) Applicant: Zenuity AB, Gothenburg (SE)

(72) Inventors: Sebastian Thelen, Freising (SE); Diana Amza, Gothenburg (SE); Eric Alexandersson, Gothenburg (SE); Jens Dackenberg, Gothenburg (SE); Lisa Lu, Hovås (SE); Cornelis Berger, Gothenburg (SE); Erik Israelsson, Gothenburg (SE)

(73) Assignee: ZENUITY AB, Gothenburg (SE)

( * ) Notice: Subject to any disclaimer, the term of this patent is extended or adjusted under 35 U.S.C. 154(b) by 347 days.

(21) Appl. No.: 16/823,531

(22) Filed: Mar. 19, 2020

(65) Prior Publication Data
US 2020/0302195 A1 Sep. 24, 2020

(30) Foreign Application Priority Data
Mar. 21, 2019 (EP) .................................... 19446502

(51) Int. Cl.
*G06K 9/00* (2022.01)
*G01C 21/36* (2006.01)
(Continued)

(52) U.S. Cl.
CPC ........... *G06V 20/582* (2022.01); *B60W 40/02* (2013.01); *G01C 21/30* (2013.01);
(Continued)

(58) Field of Classification Search
CPC ... G06V 20/582; G06V 20/588; B60W 40/02; B60W 2555/60; B60W 2540/10; B60W 2540/12; G01C 21/30; G01C 21/3602
See application file for complete search history.

(56) References Cited

U.S. PATENT DOCUMENTS

2007/0282514 A1* 12/2007 Jarrix .................... B60W 30/16
701/96
2009/0041304 A1 2/2009 Bradai et al.
(Continued)

FOREIGN PATENT DOCUMENTS

DE 102018132355 A1 * 6/2020
EP 3021302 5/2016
(Continued)

OTHER PUBLICATIONS

Machine Translation of KR20180106418 (Year: 2018).*
Machine Translation of DE102018132355A1 (Year: 2020).*

*Primary Examiner* — Rachid Bendidi
*Assistant Examiner* — Sahar Motazedi
(74) *Attorney, Agent, or Firm* — Duane Morris LLP; Gregory M. Lefkowitz; Randall C. Pyles

(57) ABSTRACT

Described herein is a method of determining a current location speed limit in a road vehicle (1) speed limit information system (20). The method comprises receiving (6): one or more signals corresponding to respective candidate speed limits (7); and one or more signals related to observed vehicle dynamics affecting changes (8) in one or more vehicles (1, 5) pre and post a most recently passed anticipated speed limit change location (2). It further comprises evaluating (9) the confidence of the different candidate speed limits (7) based on the signals related to observed vehicle dynamics affecting changes (8) and validating (10*a*) or discarding (10*b*) candidate speed limits (7) based on the evaluated confidences. A signal (13) corresponding to a highest confidence validated speed limit is output.

15 Claims, 5 Drawing Sheets

(51) Int. Cl.
*G01C 21/30* (2006.01)
*B60W 40/02* (2006.01)
*G06V 20/58* (2022.01)
*G06V 20/56* (2022.01)

(52) U.S. Cl.
CPC ....... *G01C 21/3602* (2013.01); *G06V 20/588* (2022.01); *B60W 2540/10* (2013.01); *B60W 2540/12* (2013.01); *B60W 2555/60* (2020.02)

(56) References Cited

U.S. PATENT DOCUMENTS

| | | | |
|---|---|---|---|
| 2014/0067226 A1* | 3/2014 | Lee | G01S 19/49 |
| | | | 701/96 |
| 2016/0042239 A1* | 2/2016 | Fowe | G08G 1/095 |
| | | | 382/104 |
| 2016/0210854 A1* | 7/2016 | Van Laethem | G08G 1/0133 |
| 2016/0347312 A1 | 12/2016 | Tomatsu et al. | |
| 2017/0116485 A1 | 4/2017 | Mullen | |
| 2018/0023973 A1 | 1/2018 | Ivanov et al. | |
| 2020/0050209 A1* | 2/2020 | Bai | G01C 21/3492 |

FOREIGN PATENT DOCUMENTS

| | | | |
|---|---|---|---|
| EP | 3418997 | | 12/2018 |
| KR | 20180106418 A | * | 10/2018 |

* cited by examiner

METHOD AND ARRANGEMENT FOR VALIDATING SPEED LIMIT INFORMATION FOR A ROAD VEHICLE

TECHNICAL FIELD

The present disclosure relates generally to validation of speed limit information for road vehicles, and in particular to a method of determining a current location speed limit in a road vehicle speed limit information system as well as a road vehicle speed limit information system adapted to execute the method.

BACKGROUND

Speed limit information and speed control functions are state of the art driver assistance features for automobiles. Euro NCAP and other vehicle safety rating agencies include the presence and the performance of such features in their rating procedures. Correct speed limit information in a given driving context is the basis to correctly inform the driver or to automatically adjust the set speed for speed control functions.

The speed limit at a single location may vary over time for different reasons, e.g., authorities may change the speed limit due to a changed risk assessment or it may be variable speed limit that adapts to traffic conditions. A speed limit may be conditional to, e.g., a given time of day, current weather, or vehicle category. Supplementary information may limit the applicability of a speed limit sign to a certain distance.

State of the art speed limit information systems use road sign observations from a vehicle mounted camera, including appropriate image processing software, and combine the observations with speed limit information from an on-board location referenced database, like a map. Both information sources have different causes that may lead them to supply incorrect information on the speed limit in certain traffic situations.

For example, an on-board camera may recognize a road sign incorrectly. Especially supplementary signs with numerical information are hard to correctly interpret in full. A road sign may be fully or partially obscured, covered, damaged, or positioned badly. Ambiguous sign locations may be hard to correctly associate to a road for interpretation by an algorithm, based on a short observation of the sign when passing it with a vehicle.

Furthermore, an on-board location referenced database may be outdated after a change of a speed limit or its information on a speed limit may be wrong for other reasons.

If information sources, such as the above described camera and on-board location referenced database, supply different incongruent information, the speed limit information system will have to choose to trust one source over the other. The state of the art uses various conditional heuristics, fine-tuned by engineers, to improve the likelihood to pick the correct information source in such a situation.

Deep artificial neural networks have in recent years drastically improved automated image and video classification capabilities that could help to mitigate some of the camera's weaknesses. The execution of such networks requires powerful or at least specialized computation hardware. From a cost perspective, such hardware may be viable for highly autonomous driving platforms. For mass market advanced driver assistance systems, on the other hand, alternate solutions are assumed to still be more cost effective.

A human driver, with proper awareness, typically is more capable to infer the correct speed limit given ambiguous or only partially visible road signs, may have support from other vehicle occupants, or may be able to identify a speed limit sign due to a slightly different view angle than a vehicle mounted camera.

One attempt at improving determination of a current location speed limit in a road vehicle is presented by the document US 20160042239 A1, which discloses systems, methods, and apparatuses for predicting the value of a variable speed sign (VSS) and determining the predicted value's associated confidence level. Highly assisted driving (HAD) vehicles may read or capture images of the VSS. The speed limit values, images, or videos of the VSS are reported and received by a network and database for analysis. A predicted speed limit value is determined for the variable speed sign from at least a portion of the received traffic data. A confidence level is also calculated for the predicted speed limit value for the variable speed sign.

In one embodiment, the apparatus comprises at least one processor and at least one memory including computer program code for one or more programs. The at least one memory and the computer program code configured to, with the at least one processor, cause the apparatus to at least perform: (a) receiving a set of traffic data from at least one vehicle for a defined time period, the received traffic data comprising captured images, videos, or interpreted speed limit values of a variable speed sign; (b) determining a predicted speed limit value for the variable speed sign from at least a portion of the received traffic data; and (c) calculating a confidence level for the predicted speed limit value for the variable speed sign.

However, there is room for further improving determination of a current location speed limit in a road vehicle.

SUMMARY

An object of the present invention is to provide an improved method of determining a current location speed limit in a road vehicle speed limit information system.

According to a first aspect there is provided a method of determining a current location speed limit in a road vehicle speed limit information system, the method comprising: receiving one or more signals corresponding to respective candidate speed limits; receiving one or more signals related to observed vehicle dynamics affecting changes in one or more vehicles pre and post a most recently passed anticipated speed limit change location; evaluating the confidence of the different candidate speed limits based on the signals related to observed vehicle dynamics affecting changes; validating or discarding candidate speed limits based on the evaluated confidences; and outputting a signal corresponding to a highest confidence validated speed limit.

Thus, the above method allows for improved determination of a current location speed limit in a road vehicle speed limit information system through observing road vehicle driver behavior in terms of vehicle dynamics affecting changes around the location of an anticipated speed limit change.

In a further embodiment the method further comprises receiving, as the one or more signals corresponding to respective candidate speed limits, signals from at least one of: an ego road vehicle image capture, identification, positioning and classification arrangement; and an ego road vehicle arrangement for lookup in a location referenced database based on map matched positioning information.

In a yet further embodiment the method further comprises receiving, as the one or more signals related to observed vehicle dynamics affecting changes, signals based on observations of at least one of an ego road vehicle speed and acceleration pre and post the most recently passed anticipated speed limit change location.

In a still further embodiment the method further comprises receiving, as the one or more signals related to observed vehicle dynamics affecting changes, signals based on buffered time-series of observations of at least one of an ego road vehicle speed and acceleration pre and post the most recently passed anticipated speed limit change location.

In an additional embodiment the method further comprises receiving, as the one or more signals related to observed vehicle dynamics affecting changes, signals based on at least one of stored speed offset and acceleration profiles of an ego road vehicle pre and post the most recently passed anticipated speed limit change location.

In yet an additional embodiment the method further comprises receiving, as the one or more signals related to observed vehicle dynamics affecting changes, signals based on observations of at least one of ego road vehicle accelerator pedal and brake pedal positions pre and post the most recently passed anticipated speed limit change location.

In a still further embodiment the method further comprises receiving, as the one or more signals related to observed vehicle dynamics affecting changes, signals based on buffered time-series of ego road vehicle accelerator pedal and brake pedal positions pre and post the most recently passed anticipated speed limit change location.

In a yet further embodiment the method further comprises receiving, as the one or more signals related to observed vehicle dynamics affecting changes, signals based on observations of the speed of at least one other vehicle pre and post the, by an ego vehicle, most recently passed anticipated speed limit change location.

In yet an additional embodiment the method further comprises receiving, as the one or more signals related to observed vehicle dynamics affecting changes, signals based on buffered time-series of observations of the speed of at least one other vehicle pre and post the, by an ego vehicle, most recently passed anticipated speed limit change location.

In a still further embodiment the method further comprises receiving, as the one or more signals related to observed vehicle dynamics affecting changes, signals based on one or more stored speed offset profiles of at least one other vehicle pre and post the, by an ego vehicle, most recently passed anticipated speed limit change location.

In yet one embodiment the method further comprises receiving, from a centralized information processing service, as at least one of the one or more signals corresponding to respective candidate speed limits, a speed limit estimate with an accompanying confidence, signals based on clustered and stored data from observations of vehicle dynamics affecting changes by one or more vehicles comprising the observations locations and aggregated with weights based on the confidence and age of each observation of at least one of speeds, accelerations and pedal positions pre and post the, by an ego vehicle, most recently passed anticipated speed limit change location.

In a yet further embodiment the method further comprises that the signals from the centralized information processing service are also based on clustered and stored data from one or more signals corresponding to respective candidate speed limits obtained by the one or more vehicles at the, by an ego vehicle, most recently passed anticipated speed limit change location through one or more of: image capture, identification, positioning and classification; and lookup in a location referenced database based on map matched positioning information.

According to a second aspect there is provided road vehicle speed limit information system having one or more interfaces for: receiving one or more signals corresponding to respective post-location candidate speed limits, and receiving one or more signals related to observed vehicle dynamics affecting changes in one or more vehicles pre and post a most recently passed anticipated speed limit change location; and outputting a signal corresponding to a validated speed limit; and having means adapted to execute the steps of the herein described method.

In one embodiment is provided for a road vehicle speed limit information system, as above, further having means for wireless communication with a centralized information processing service.

According to a third aspect there is provided a computer program comprising instructions to cause the herein described road vehicle speed limit information system to execute the herein described method.

The above embodiments have the beneficial effects of providing for improved determination of a current location speed limit in a road vehicle speed limit information system through observations of road vehicle driver behavior in terms of observed vehicle dynamics affecting changes, such as e.g., vehicle acceleration, both positive and negative, and brake or accelerator pedal positions before, at, or shortly after the location of an anticipated speed limit change.

BRIEF DESCRIPTION OF DRAWINGS

In the following, embodiments herein will be described in greater detail by way of example only with reference to attached drawings, in which.

DESCRIPTION OF EMBODIMENTS

In the following will be described some example embodiments of a method of determining a current location speed limit in a road vehicle 1 speed limit information system.

Figure 1:
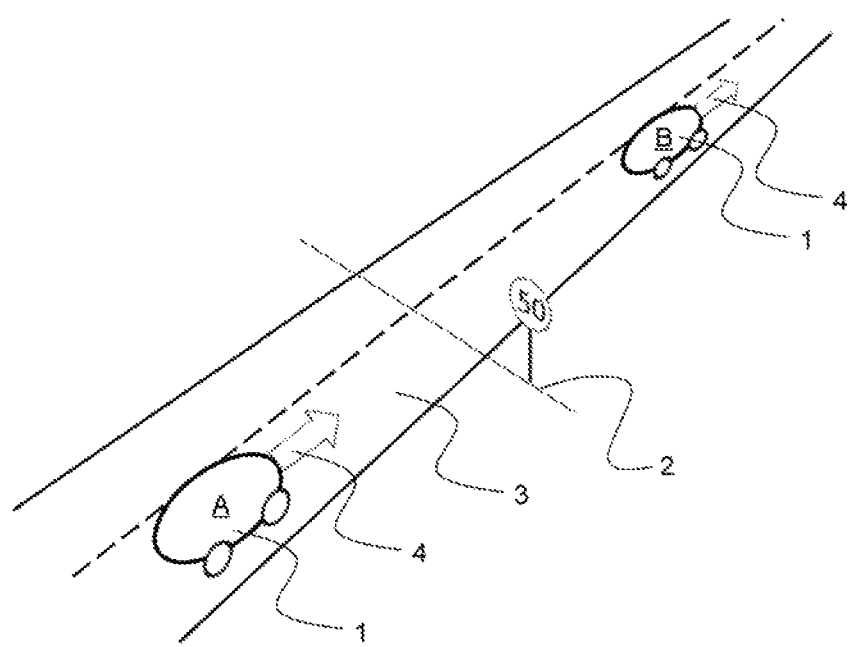
FIG. 1 illustrates schematically how observations of dynamic changes in a road vehicle around a location of an anticipated speed limit change may be used as indicators in support of a speed limit change at that location.

The proposed method is, as illustrated schematically in FIG. 1, based on the realization that observations of road vehicle 1 driver behavior in terms of road vehicle 1 acceleration, both positive and negative, and brake or accelerator pedal positions before (indicated in FIG. 1 as position A), at, or shortly after (indicated in FIG. 1 as position B) the location 2 of an anticipated speed limit change at a road 3 may be used as indicators in support of a speed limit change at that location 2. The dotted arrows 4 indicates the direction of travel of the road vehicle 1 in FIG. 1.

It is furthermore based on the realization that previously observed relative or absolute offsets of average driving speed to a speed limit that is known with high confidence will offer an indicator as to a road vehicles 1 speed offset after its speed has been adapted to a new speed limit, e.g., by a driver thereof.

Observations of the above may be taken from the road vehicle 1 that hosts the speed limit information system or from surrounding road vehicles 5, from whom it is possible to observe speeds and relative locations accurately enough.

With some or a plurality of such observations, a pre-tuned heuristic algorithm in the speed limit information system will have a good information basis to decide what speed limit applies to the current driving context.

Figure 2:
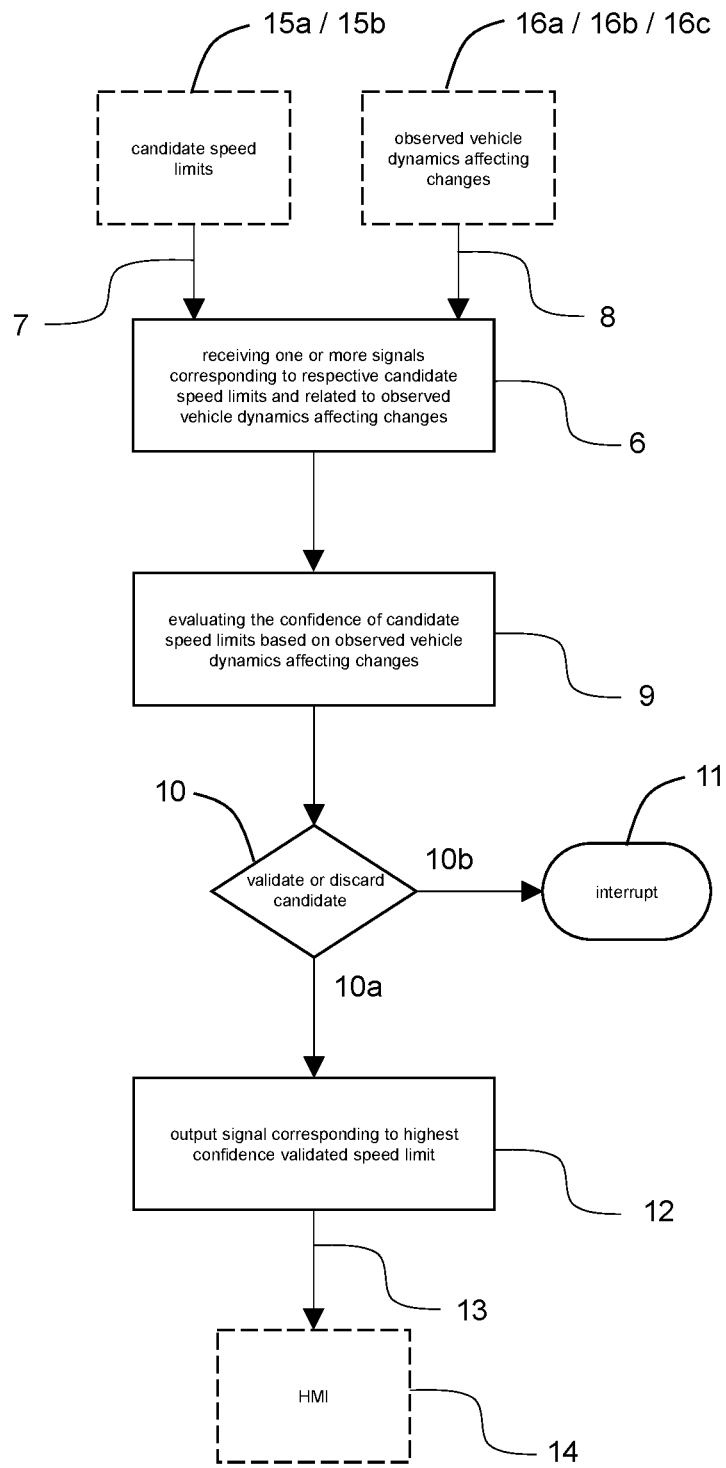
FIG. 2 illustrates schematically the method of determining a current location speed limit in a road vehicle speed limit information system according to embodiments herein.

Thus, as illustrated schematically in FIG. 2, is proposed a method of determining a current location speed limit in a road vehicle 1 speed limit information system. The method comprises: receiving 6 one or more signals corresponding to respective candidate speed limits 7. It also comprises receiving one or more signals related to observed vehicle dynamics affecting changes 8 in one or more vehicles 1, 5 pre and post a most recently passed anticipated speed limit change location 2.

The method further comprises evaluating 9 the confidence of the different candidate speed limits 7 based on the signals related to observed vehicle dynamics affecting changes 8.

The evaluated confidences are used 10 for validating 10*a* or discarding 10*b* candidate speed limits 7 based on the evaluated confidences. For candidate speed limits 7 that cannot be validated but are discarded 10*b* the method is interrupted 11.

If one or more candidate speed limits 7 are validated 10*a* the method is concluded by outputting 12 a signal 13 corresponding to a highest confidence validated speed limit 7. The signal 13 corresponding to the highest confidence validated speed limit 7 may, e.g., by output to a human machine interface (HMI) 14, such as a display or head-up-display unit for presenting the speed limit 7 to a driver of the road vehicle 1.

The one or more signals corresponding to respective candidate speed limits 7 may be received from road sign observations 15*a*, acquired from a vehicle mounted camera, such as a forward-facing front view camera, having appropriate image processing software. Such observations may be combined with speed limit information 15*b* from an on-board, location referenced database, like a map, usually referenced using a Global Navigation Satellite System (GNSS), such as e.g. the satellite based global positioning system (GPS), to provide the respective candidate speed limits 7.

Thus, in some embodiments the method further comprises receiving 6, as the one or more signals corresponding to respective candidate speed limits 7, signals 15*a*, 15*b* from at least one of; an ego road vehicle 1 image capture, identification, positioning and classification arrangement; and an ego road vehicle 1 arrangement for lookup in a location referenced database based on map matched positioning information.

The one or more signals related to observed vehicle dynamics affecting changes 8 in one or more vehicles 1, 5 pre and post a most recently passed anticipated speed limit change location 2 may, as mentioned above, be received from the vehicle 1 that hosts the speed limit information system, i.e. the ego road vehicle 1, or from surrounding vehicles 5. The information may be obtained through observing changes in velocities and/or accelerations of road vehicles 1, 5 passing a location 2 of a speed limit change.

Thus, in some embodiments the method further comprises receiving 6, as the one or more signals related to observed vehicle dynamics affecting changes 8, signals based on observations of at least one of an ego road vehicle 1 speed and acceleration 16*a* pre and post the most recently passed anticipated speed limit change location 2.

Ego road vehicle 1 speed data may be obtained from an ego vehicle 1 speedometer, e.g., via a vehicle CAN-bus or similar. Ego road vehicle 1 acceleration data may be obtained from on-board accelerometers.

One efficient way of observing such changes is to study buffered time-series of observations.

Thus, in some further embodiments the method further comprises receiving 6, as the one or more signals related to observed vehicle dynamics affecting changes 8, signals based on buffered time-series of observations of at least one of an ego road vehicle 1 speed and acceleration 16*a* pre and post the most recently passed anticipated speed limit change location 2.

Another way of observing such changes is to study speed offset and acceleration profiles.

Thus, in some additional embodiments the method further comprises receiving 6, as the one or more signals related to observed vehicle dynamics affecting changes 8, signals based on at least one of stored speed offset and acceleration profiles of an ego road vehicle 1 pre and post the most recently passed anticipated speed limit change location 2.

Furthermore, observations of a road vehicle 1 driver behavior in terms of brake or accelerator pedal positions 16*b* before, at, or shortly after the location of an anticipated speed limit change 2 will be an indicator in support of a speed limit change at that location 2.

Thus, in additional embodiments the method further comprises receiving 6, as the one or more signals related to observed vehicle dynamics affecting changes 8, signals based on observations of at least one of ego road vehicle 1 accelerator pedal and brake pedal positions 16*b* pre and post the most recently passed anticipated speed limit change location 2.

This may be enhanced further through the use of buffered time-series of accelerator pedal and brake pedal positions 16*b*.

Thus, in further embodiments the method further comprises receiving 6, as the one or more signals related to observed vehicle dynamics affecting changes 8, signals based on buffered time-series of ego road vehicle 1 accelerator pedal and brake pedal positions 16*b* pre and post the most recently passed anticipated speed limit change location 2.

Figure 3:
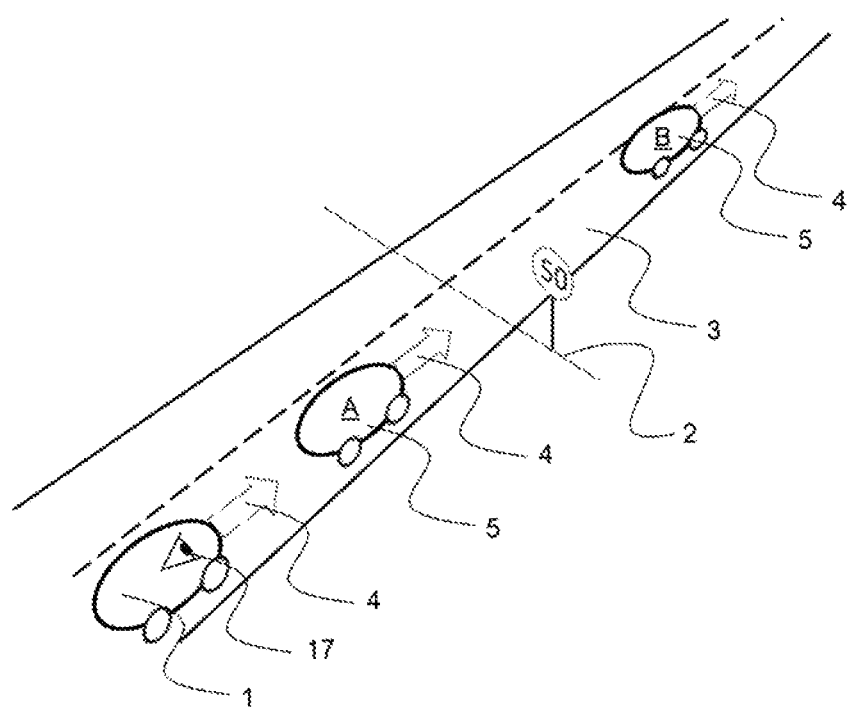
FIG. 3 illustrates schematically how information on vehicle dynamics affecting changes obtained from observing surrounding vehicles may be used as indicators in support of a speed limit change at a location according to embodiments herein.

As mentioned above, information on vehicle dynamics affecting changes may, as illustrated in FIG. 3, also be obtained from observing surrounding vehicles 5. Such surrounding vehicle 5 observations 16*c* may be acquired using sensors 17 borne by the ego road vehicle 1, such as camera-, radar- or lidar-sensors and combinations of such sensors, e.g., through sensor fusion.

FIG. 3 illustrates schematically how a surrounding road vehicle 5 is observed by sensors 17, illustrated as an eye in FIG. 3, as it travels from a position A, before the anticipated speed limit change location 2, to a position B, after the anticipated speed limit change location 2.

In such embodiments the method further comprises receiving 6, as the one or more signals related to observed vehicle dynamics affecting changes 8, signals based on observations 16c of the speed of at least one other vehicle 5 pre and post the, by an ego vehicle 1, most recently passed anticipated speed limit change location 2.

The confidence of different candidate speed limits 7 may be evaluated based on the signals related to observed vehicle dynamics affecting changes 8 using a statistical approach, e.g., using deviations and quantifying observed offsets before and after a speed limit change location 2. An observed slight reduction in speed in a road vehicle 1, 5 after a speed limit change location 2 may e.g., be used as a hint of a speed limit change at that location 2.

Depending on a magnitude of a speed reduction or increase, a higher or lower confidence may be awarded that there really is a speed limit change at that location 2.

Also, by aggregating information from several road vehicles 1, higher confidence information may be acquired that there really is a speed limit change at a certain location 2.

Thus, in some embodiments the method further comprises receiving 6, as the one or more signals related to observed vehicle dynamics affecting changes 8, signals based on buffered time-series of observations of the speed of at least one other vehicle 5 pre and post the, by an ego vehicle 1, most recently passed anticipated speed limit change location 2.

Signals related to observed vehicle dynamics affecting changes 8 may also originate from observed speed offset profiles, where the number of profiles used may increase the confidence of the information.

In such further embodiments the method further comprises receiving 6, as the one or more signals related to observed vehicle dynamics affecting changes 8, signals based on one or more stored speed offset profiles of at least one other vehicle pre and post the, by an ego vehicle, most recently passed anticipated speed limit change location 2.

Figure 4:
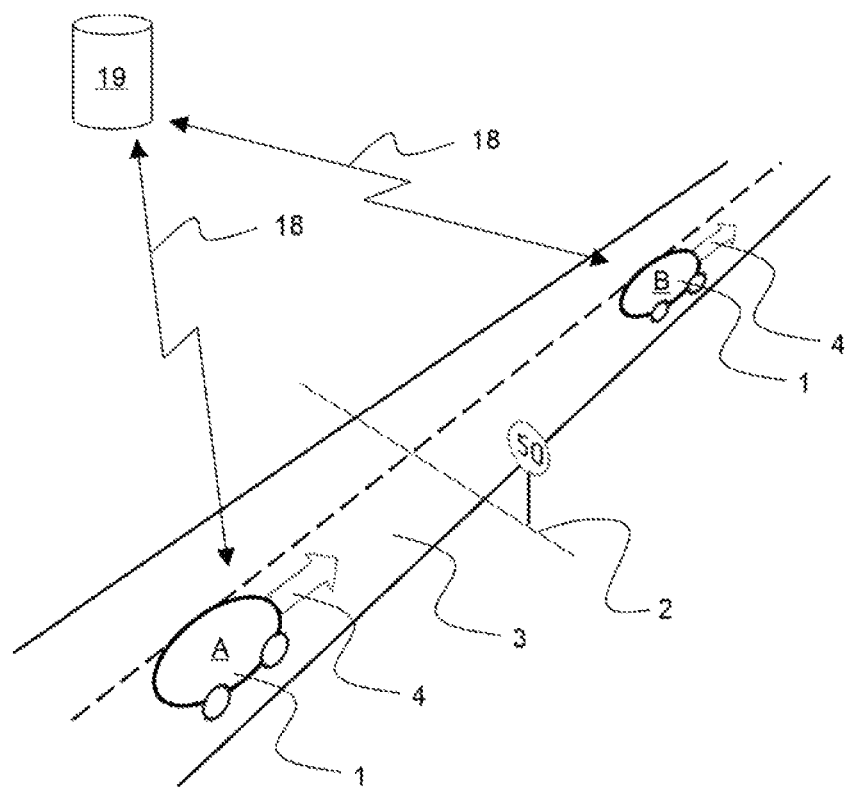
FIG. 4 illustrates schematically how a centralized information processing service may cluster observations from one or more road vehicles to deduce a speed limit estimate for a location and an accompanying confidence according to embodiments herein.

Furthermore, as illustrated in FIG. 4, using suitable communication channels, as illustrated by arrows 18, speed limit information systems may transmit observations to a centralized information processing service 19. Suitable communications channels 18 may e.g., be based on technologies such as 4G and 5G networks, automotive WiFi etc. The centralized information processing service 19 may then cluster the observations that it receives from one or more road vehicles 1, based on the observations' location 2. For each location 2, it then aggregates the observations with a weight based on the observation's confidence and age to deduce a speed limit estimate 7 for the location 2 and an accompanying confidence.

In such embodiments the method further comprises receiving 6, from a centralized information processing service 19, as at least one of the one or more signals corresponding to respective candidate speed limits 7, a speed limit estimate with an accompanying confidence based on clustered and stored data from observations of vehicle dynamics affecting changes by one or more vehicles 1 comprising the observations locations 2 and aggregated with weights based on the confidence and age of each observation of at least one of speeds, accelerations and pedal positions pre and post the, by an ego vehicle 1, most recently passed anticipated speed limit change location 2.

When transmitting observations to the centralized information processing service 19, the speed limit information systems may optionally enrich them with information on the speed limits that on-board cameras and on-board location databases supply for the observation's location 2.

In such further embodiments the method further comprises that the signals from the centralized information processing service are also based on clustered and stored data from one or more signals corresponding to respective candidate speed limits 7 obtained by the one or more vehicles 1 at the, by an ego vehicle 1, most recently passed anticipated speed limit change location 2 through one or more of: image capture, identification, positioning and classification; and lookup in a location referenced database based on map matched positioning information.

The centralized information processing service 19 may be arranged to keep computed speed limit estimates and the confidences into those estimates available so that a vehicle 1 that is equipped with a suitable speed limit information system and a suitable communication channel 18 to the centralized information processing service 19 may receive speed limit estimates 7 for both its current and its predicted upcoming locations.

The speed limit information system may then be arranged to use the speed limit estimate 7 and associated confidence as additional information source into a heuristic that determines the speed limit at the road vehicle's current location.

Figure 5:
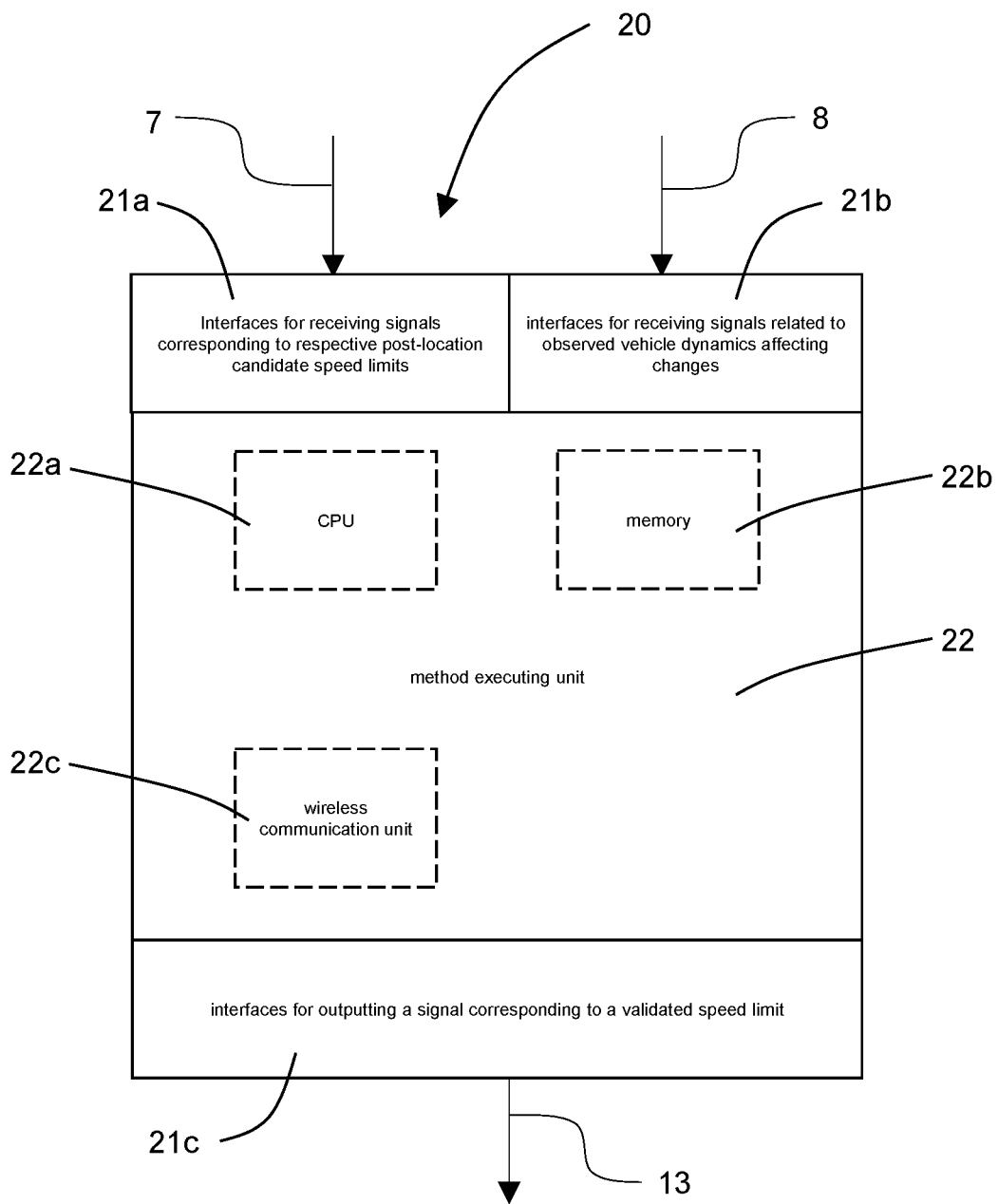
FIG. 5 illustrates schematically a road vehicle speed limit information system according to embodiments herein.

Further envisaged is a road vehicle speed limit information system 20, as illustrated schematically in FIG. 5, having one or more interfaces 21a, 21b, 21c for: one or more interfaces 21a for receiving one or more signals corresponding to respective post-location candidate speed limits 7, and one or more interfaces 21b for receiving one or more signals related to observed vehicle dynamics affecting changes 8 in one or more vehicles 1, 5 pre and post a most recently passed anticipated speed limit change location 2; and one or more interfaces for outputting a signal corresponding to a validated speed limit 13; and having means 22 adapted to execute the steps of the herein described method.

The means 22 adapted to execute the steps of the herein described method may e.g., comprise a central processing unit (CPU) 22a and to process the computing instructions in accordance with the herein described method, and a memory 22b storing instructions, e.g., software, executable by the central processing unit 22a, the software including instructions for carrying out various steps and processes described herein when executed by the central processing unit 22a.

For some embodiments is also provided for a road vehicle speed limit information system 20, as above, further having means for wireless communication 22c with a centralized information processing service 19, as described above. The means 22c for wireless communication may e.g., be arranged to communicate using 4G or 5G technologies or automotive WiFi technology etc. It is envisaged that the CPU 22a, the memory 22b and the means 22c for wireless communication may be arranged within one and the same physical unit, however, it is also envisaged herein that one unit may contain the CPU 22a and the memory 22b whilst another unit contains the means 22c for wireless communication, with some vehicle network and potentially other units in between. The CPU 22a and the memory 22b may e.g. reside in an advanced driver assistance system (ADAS) electronic control unit (ECU) and the means 22c for wireless communication in a separate telemetry or communications ECU, both connected over, e.g., a Controller Area Network (CAN) bus, possibly with additional gateway ECUs in-between.

It is further envisaged that the computing instructions of the herein described method may be provided as a computer program comprising instructions to cause the herein described road vehicle speed limit information system 20 to execute the herein described method.

Processing/aggregation of information may be done locally in the ego road vehicle 1 or at a centralized information processing service 19, sometimes referred to as cloud, or distributed therebetween. Alternatively, some of the information is pre-processed locally in the ego road vehicle 1 and aggregated at a remote cloud server of the centralized information processing service 19. Partial or full processing may also be performed at the remote server.

A remote server may be one or more computer servers, each generally including at least one processor and at least one memory (not shown), the memory storing instructions, e.g., software, executable by the processor, including instructions for carrying out various steps and processes described herein.

Communication of obtained data to a data processing arrangement 19 located at such a remote server, sometimes denominated cloud, and back to a speed limit information system 20 of the road vehicle 1 may further include a communication network 18 connected to the remote server. Such a communication network 18 represents one or more mechanisms by which a road vehicle 1 may communicate with the remote server. Accordingly, the communication network 18 may be one or more of various wireless communication mechanisms, including any desired combination of wireless, e.g., radio frequency, cellular, satellite, and microwave communication mechanisms and any desired network topology. Exemplary communication networks include wireless communication networks, e.g., using Bluetooth, IEEE 802.11, LTE, 5G, etc.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. In cases where advantages, benefits or solutions to problems are described herein, it should be appreciated that such advantages, benefits and/or solutions may be applicable to some example embodiments, but not necessarily all example embodiments. Thus, any advantages, benefits or solutions described herein should not be thought of as being critical, required or essential to all embodiments or to that which is claimed herein. Although specific terms are employed herein, they are used in a generic and descriptive sense only and not for purposes of limitation.

The invention claimed is:

1. A method of determining a current location speed limit in an ego road vehicle (1) speed limit information system (20) that includes a central processing unit (22), the method comprising:

receiving (6), by the central processing unit, one or more signals corresponding to respective candidate speed limits (7);

receiving (6), by the central processing unit, one or more signals related to observed vehicle dynamics affecting changes (8) in one or more vehicles before and after a most recently passed anticipated speed limit change location (2), wherein the one or more vehicles includes an ego road vehicle and one or more other vehicles;

evaluating (9), by the central processing unit, a confidence of each respective candidate speed limit (7) based on the received one or more signals related to observed vehicle dynamics affecting changes (8), the evaluating using deviations and quantifying observed offsets before and after the most recently passed anticipated speed limit change location, the confidence being based on clustered and stored data from observations of vehicle dynamics affecting changes by the one or more vehicles comprising observations locations and aggregated with weights based on confidence and age of each observation of at least one of speeds, accelerations, and pedal positions before and after the most recently passed anticipated speed limit change location;

validating (10a) or discarding (10b), by the central processing unit, each respective candidate speed limit (7) based on the evaluated confidences; and outputting (12), by the central processing unit, a signal corresponding to a validated speed limit (13) having a highest evaluated confidence.

2. The method according to claim 1, wherein the method further comprises receiving (6), as the one or more signals corresponding to respective candidate speed limits (7), signals from at least one of:

an image capture, identification, positioning and classification arrangement (15a) of the ego road vehicle; and an arrangement for lookup in a location referenced database based on map matched positioning information (15b) of the ego road vehicle.

3. The method according to claim 1, wherein the received one or more signals related to observed vehicle dynamics affecting changes (8) are based on observations of at least one of speed and acceleration of the ego road vehicle (1) before and after the most recently passed anticipated speed limit change location (2).

4. The method according to claim 3, wherein the received one or more signals related to observed vehicle dynamics affecting changes (8) are based on a buffered time-series of the observations of at least one of the ego road vehicle (1) speed and acceleration before and after the most recently passed anticipated speed limit change location (2).

5. The method according to claim 3, wherein the received one or more signals related to observed vehicle dynamics affecting changes (8) are based on at least one of stored speed offset and acceleration profiles of the ego road vehicle (1) before and after the most recently passed anticipated speed limit change location (2).

6. The method according to claim 1, wherein the received one or more signals related to observed vehicle dynamics affecting changes (8) are based on observations of at least one of accelerator pedal and brake pedal positions of the ego road vehicle (1) before and after the most recently passed anticipated speed limit change location (2).

7. The method according to claim 6 wherein the received one or more signals related to observed vehicle dynamics affecting changes (8), received are based on a buffered time-series of the ego road vehicle (1) accelerator pedal and brake pedal positions before and after the most recently passed anticipated speed limit change location (2).

8. The method according to claim 1, wherein the received one or more signals related to observed vehicle dynamics affecting changes (8) are based on observations of a speed of at least one of the one or more other vehicles (5) before and after the most recently passed anticipated speed limit change location (2).

9. The method according to claim 8, wherein the received one or more signals related to observed vehicle dynamics affecting changes (8) are based on a buffered time-series of the observations of the speed of the at least one of the one or more other vehicles (5) before and after the most recently passed anticipated speed limit change location (2).

10. The method according to claim 8, wherein the received one or more signals related to observed vehicle dynamics affecting changes (8) are based on one or more stored speed offset profiles of the at least one of the one or more other vehicles (5) before and after the most recently passed anticipated speed limit change location (2).

11. The method according to claim 1, wherein the method further comprises receiving (6) at least one of the one or more signals corresponding to respective candidate speed limits from a centralized information processing service (19), as a speed limit estimate with an accompanying confidence based on the clustered and stored data from the observations of vehicle dynamics affecting changes by the one or more vehicles (1) comprising the observations locations and aggregated with weights based on the confidence and age of each observation of at least one of the speeds, accelerations, and pedal positions before and after the most recently passed anticipated speed limit change location (2).

12. The method according to claim 11, wherein the at least one of the one or more signals corresponding to respective candidate speed limits received from the centralized information processing service (19) is also based on clustered and stored data from the one or more signals corresponding to respective candidate speed limits (7) obtained by the one or more vehicles (1) at the most recently passed anticipated speed limit change location (2) through one or more of:
  image capture, identification, positioning and classification; and
  lookup in a location referenced database based on map matched positioning information.

13. The ego road vehicle speed limit information system (20) having one or more interfaces (21a, 21b, 21c) for:
  receiving the one or more signals corresponding to respective candidate speed limits (7);
  receiving the one or more signals related to observed vehicle dynamics affecting changes (8) in the one or more vehicles (1, 5) before and after the most recently passed anticipated speed limit change location (2);
  outputting the signal (13) corresponding to the validated speed limit; and
  being (22a, 22b) adapted to execute the method of claim 1.

14. The ego road vehicle speed limit information system (20) according to claim 13, further comprising circuitry to wirelessly communicate with a centralized information processing service (19).

15. A non-transitory computer-readable medium including executable instructions that when executed by a processor cause the ego road vehicle (3) speed limit information system (20) to execute the method of claim 1.

* * * * *